United States Patent
Melwanki et al.

(10) Patent No.: US 12,437,624 B2
(45) Date of Patent: Oct. 7, 2025

(54) METHODS AND SYSTEMS FOR MONITORING AN ACTIVITY OF A REMOTE USER

(71) Applicant: DISH Network Technologies India Private Limited, Bangalore (IN)

(72) Inventors: Yashwanth Melwanki, Bangalore (IN); Prasanna Kumar L, Bangalore (IN); Mansoor Ahmed, Bangalore (IN)

(73) Assignee: DISH Network Technologies India Private Limited, Bangalore (IN)

( * ) Notice: Subject to any disclaimer, the term of this patent is extended or adjusted under 35 U.S.C. 154(b) by 109 days.

(21) Appl. No.: 18/399,407

(22) Filed: Dec. 28, 2023

(65) Prior Publication Data

US 2025/0218271 A1   Jul. 3, 2025

(51) Int. Cl.
  *G08B 21/04* (2006.01)
  *G16H 40/67* (2018.01)
  *G16H 50/20* (2018.01)
  *H04W 76/19* (2018.01)
  *H04W 76/50* (2018.01)

(52) U.S. Cl.
  CPC ..... *G08B 21/0453* (2013.01); *G08B 21/0446* (2013.01); *G16H 40/67* (2018.01); *G16H 50/20* (2018.01); *H04W 76/19* (2018.02); *H04W 76/50* (2018.02)

(58) Field of Classification Search
  CPC ....... G16H 40/67; G16H 50/20; H04W 4/029; H04W 76/50; H04W 76/19; G08B 21/0446; G08B 21/0453
  See application file for complete search history.

(56) References Cited

U.S. PATENT DOCUMENTS

| | | | |
|---|---|---|---|
| 9,406,220 B2* | 8/2016 | Proud | H04W 4/70 |
| 2017/0103178 A1* | 4/2017 | Heinrich | G16H 50/30 |
| 2017/0303846 A1* | 10/2017 | O'Brien | A61B 5/7278 |
| 2020/0334967 A1* | 10/2020 | Sharma | G08B 21/0453 |
| 2021/0241912 A1* | 8/2021 | Chazin | G08B 21/0446 |

\* cited by examiner

*Primary Examiner* — John A Tweel, Jr.
(74) *Attorney, Agent, or Firm* — Perkins Coie LLP (57) ABSTRACT

The present disclosure is directed to methods and systems for monitoring the activity of a user. A user performing an activity in a remote area can carry or wear an activity device. The activity device, such as a wearable device, can collect sensor data and send the sensor data to an activity tracking system. The activity tracking system can analyze the sensor data to determine if the user is in potential danger. If a potential danger is detected, the activity tracking system can send a notification to an emergency contact to alert them of the potential danger of the user.

20 Claims, 6 Drawing Sheets

METHODS AND SYSTEMS FOR MONITORING AN ACTIVITY OF A REMOTE USER

BACKGROUND

A user can perform recreational activities, such as hiking or backpacking, in remote areas. In these remote areas, a user can perform dangerous activities, such as climbing rocks, that can result in injury to the user. However, an injury in a remote area can become life threatening if no one is monitoring the user during their recreational activity.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to systems and methods for monitoring the activity of a remote user. A user performing an activity (e.g., trekking, hiking, backpacking, skiing, or similar recreation) in a remote area can carry or wear an activity device. The activity device (e.g., a wearable device, such as a watch), can collect and send sensor data to an activity tracking system. The sensor data can include location data, health data, altitude data, external pressure data, accelerometer data, and/or oxygen in air data. The activity tracking system can analyze the sensor data to determine if the user is in potential danger. For example, the sensor data indicates that the user is unconscious, has a low respiratory rate, or has fallen from a height. If a potential danger is detected, the activity tracking system can send a notification to an emergency contact to alert them of the potential danger to the user.

If the activity device lost connectivity with the activity tracking system, the activity device can generate a local network connection with a proximity device that is connected to the activity tracking system. The activity device can send the sensor data of the user to the proximity device via the local connection network. Upon receiving the sensor data, the proximity device can relay the sensor data of the user to the activity tracking system.

Figure 1:
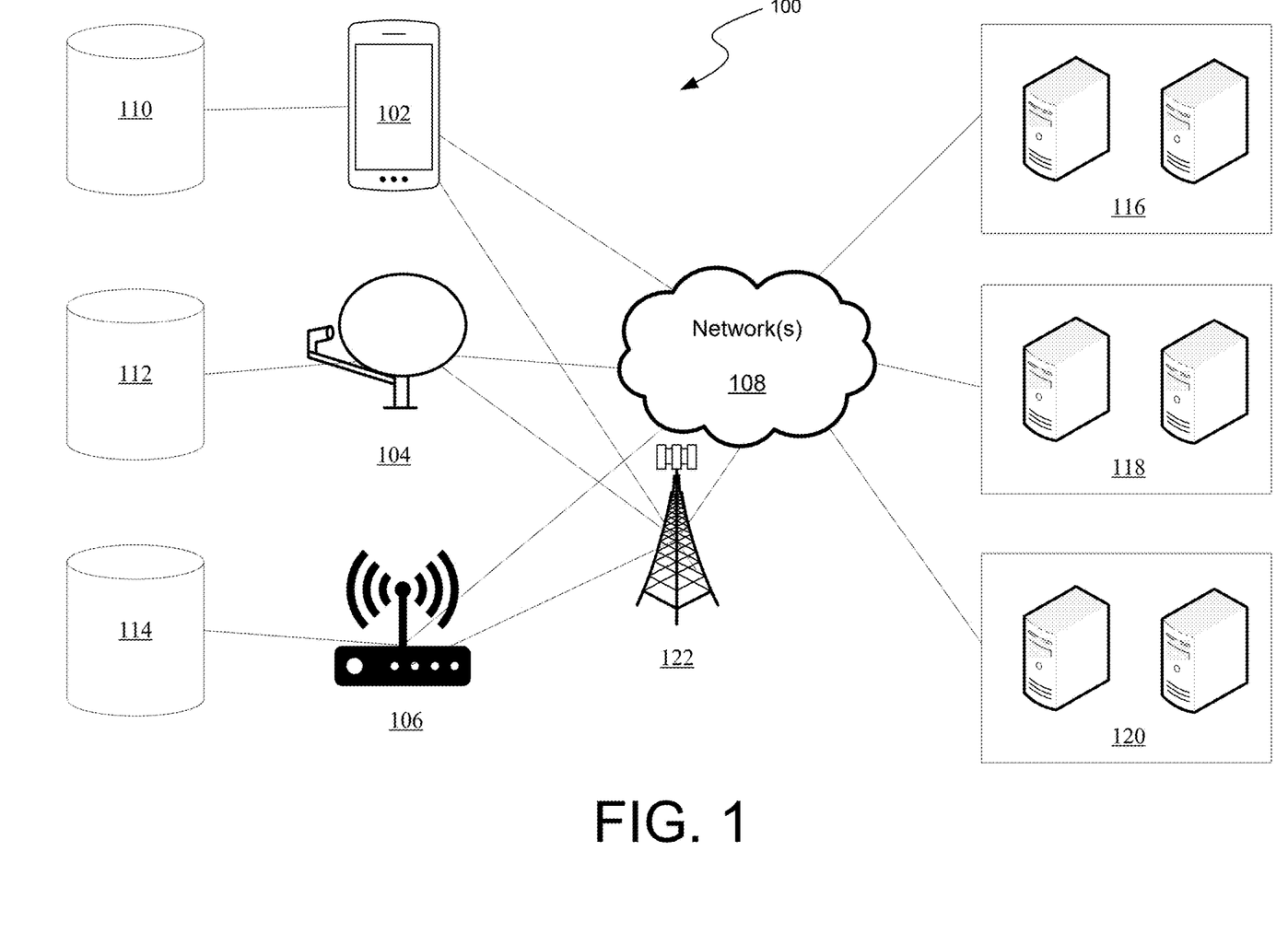
FIG. 1 illustrates an example of a distributed system for monitoring an activity of a remote user, in accordance with one or more embodiments of the present technology.

FIG. 1 illustrates an example of a distributed system for monitoring an activity of a remote user. Example system 100 presented is a combination of interdependent components that interact to form an integrated whole for monitoring an activity of a remote user. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to support accessing an activity tracking system to input information (e.g., sensor data), determine if the user it at risk, and generate an alert. In one example, a client device 102 may be a mobile phone, a client device 104 may be a smart OTA antenna, and a client device 106 may be a broadcast module box (e.g., set-top box). In other example aspects, client device 106 may be a gateway device (e.g., router) that is in communication with sources, such as ISPs, cable networks, internet providers, or satellite networks. Other possible client devices include but are not limited to tablets, personal computers, televisions, etc. In aspects, a client device, such as client devices 102, 104, and 106, may have access to a network from a gateway. In other aspects, client devices 102, 104, and 106, may be equipped to receive data (e.g., instructions from a server) from a gateway. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that allows a user to access the activity tracking system, enter sensor information or user parameters, and receive local network connectivity. Client devices 102, 104, and 106 may access the activity tracking system and the sensor data through the networks. The data may be stored locally on the client device or run remotely via network(s) 108. For example, a client device may receive a signal from broadcast tower 122 containing feature data. The signal may indicate the sensor data. The client device may receive this user sensor data and subsequently store this data locally in databases 110, 112, and/or 114. In alternative scenarios, the user requested content data may be transmitted from a client device (e.g., client device 102, 104, and/or 106) via network(s) 108 to be stored remotely on server(s) 116, 118, and/or 120. A user may subsequently access the sensor data from a local database (110, 112, and/or 114) and/or external database (116, 118, and/or 120), depending on where the sensor data may be stored. The system may be configured to receive sensor data and perform a risk analysis in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the content data from a channel from an OTA antenna (e.g., antenna 104). A graphical user interface may display on the mobile device 102 the sensor and/or notification data. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in providing a user access to the activity tracking system. Such databases may contain certain sensor data, such as location data, health data, altitude data, external pressure data, accelerometer data, and/or oxygen in air data. Such data may be transmitted via network(s) 108 to client devices 102, 104, and/or 106 to assist in assessing the health risk of a user. Because broadcast tower 122 and network(s) 108 are configured to communicate with one another, the systems and methods described herein may be able to identify sensor data in different sources, such as streaming services, local and cloud storage, cable, satellite, or OTA.

Figure 2:
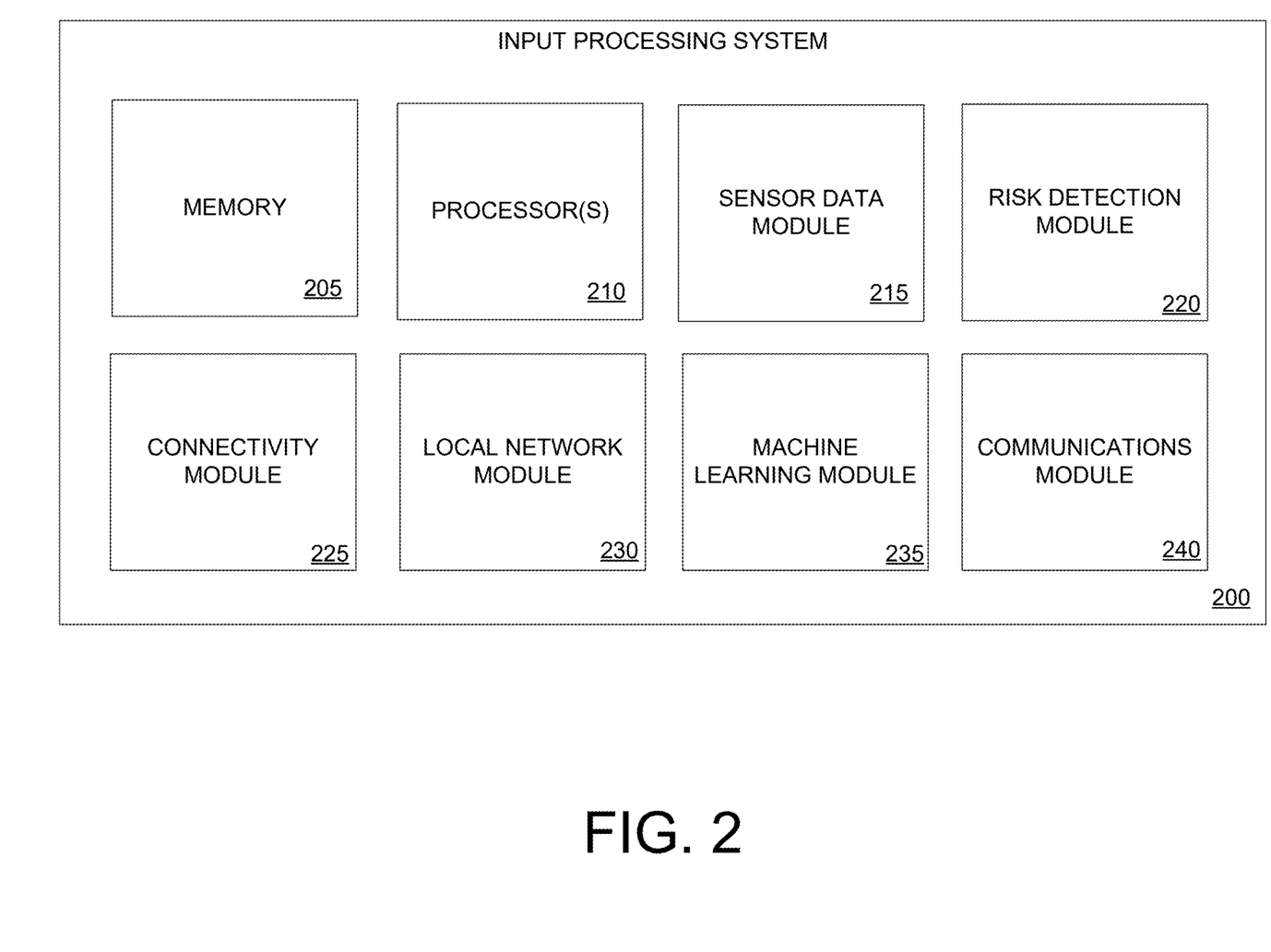
FIG. 2 illustrates an example input processing system for implementing systems and methods for monitoring an activity of a remote user, in accordance with one or more embodiments of the present technology.

FIG. 2 illustrates an example input processing system for implementing systems and methods for monitoring an activity of a remote user. The input processing system 200 (e.g., one or more data processors) is capable of executing algorithms, software routines, and/or instructions based on processing data provided by a variety of sources related to monitoring activities of a remote user. The input processing system can be a general-purpose computer or a dedicated, special-purpose computer. According to the embodiments shown in FIG. 2, the disclosed system can include memory 205, one or more processors 210, sensor data module 215, risk detection module 220, connectivity module 225, local network module 230, machine learning module 235, and communications module 240. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of sensor data module 215, risk detection module 220, connectivity module 225, local network module 230, machine learning module 235, and communications module 240. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMS, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing the feature information, historical issue information, risk information, and any information associated with the release assessment system.

Sensor data module 215 may be configured to receive senor data from the activity device during an activity. The activity device can send the sensor data continuously or periodically, such as every second, minute or hourly. The sensor data can include location data, health data, altitude data, external pressure data, accelerometer data, and/or oxygen in air data. The health data can include blood pressure, oxygen saturation (SpO2), heart rate, respiratory rate, body temperature, or other vital signs of the user.

Risk detection module 220 may be configured to compare the health data to the user parameters to determine if the user is experiencing a health incident. The health incident is determined when the health data is outside of a range for the user. For example, if the heart rate of the user is outside of a range of 60 to 100 beats per minute (bpm), the risk detection module 220 determines the user has experienced a health incident. If the health data is outside the range of the user parameters, the risk detection module 220 generates an alert that the user has experienced a health incident.

The risk detection module 220 analyzes the sensor data to identify potential risks to the user. The sensor data can indicate if the user has experienced an event that requires assistance. For example, the accelerometer data indicates that the user has fallen to the ground suddenly or has fallen from a height above a threshold (e.g., 6 feet, 10 feet, or any determined distance). The risk detection module 220 can determine a correlation between two or more types of the sensor data. The correlation can relate the different types of sensor data to determine potential risks the user has experienced. For example, the user has experienced a potential danger if their location is not changing but their heart rate is elevated. If a correlation is determined, the risk detection module 220 generates an alert that the user has experienced a health incident.

Connectivity module 225 may be configured to establish a connection between the activity tracking system and the activity device. The activity device can connect to the activity tracking system via a satellite communication link, a cellular network connection, or a Wi-Fi network connection. The activity device can connect to the activity tracking system whenever powered on, when the activity device is a threshold distance (e.g., mile, 3 miles, or any selected distance) from a user specified location, or when a user input (e.g., pressing a button, voice command, etc.) triggers the connection.

Local network module 230 may be configured to determine a loss of connection between the activity tracking system and the activity device. The local network module 230 can determine the loss of connection based on the activity device not responding to transmissions (e.g., pings) from the activity tracking system for a threshold amount of time (e.g., 5 seconds, 2 minutes, or any determined amount of time) or threshold number of transmissions (e.g., 5, 10, or any determined number). In some implementations, the loss of connection is based on the network quality dropping below a threshold. The network quality can be measured in bandwidth, latency, jitter, packet loss, and/or throughput of the connection. If a loss of connectivity is detected, the local network module 230 sends an instruction to a proximity device to generate a local network connection with the activity device. The proximity device establishes a local network connection with the activity device. The local network connection can include a local area network (LAN), a citizens broadband radios service (CBRS) connection, wireless personal area network (WPAN) connection, a Wi-Fi network connection, or any local network connection. The local network module 230 can create a local network for communicating between multiple activity devices. If one of the activity devices loses connection with a server, one or more of the other locally connected activity devices can relay sensor data to the server for the disconnected device.

Machine learning module 235 may be configured to determine a connection loss and generate a local network connection between activity devices. The machine learning module 235 may be configured to determine a connection loss and generate a local network connection between activity devices based on at least one machine-learning algorithm trained on at least one dataset reflecting user identified connection loss detection of previous connection failures. The at least one machine-learning algorithms (and models) may be stored locally at databases and/or externally at databases (e.g., cloud databases and/or cloud servers). Client devices (e.g., personal computers, smart phones, tablets, etc.) may be equipped to access these machine learning algorithms and intelligently determine a connection loss and generate a local network connection between activity devices based on at least one machine-learning model that is trained on historical connection failures. For example, connection loss history may be collected to train a machine-learning model to automatically determine a connection loss and generate a local network connection between activity devices.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process historical connection losses and other data stores (e.g., hardware testing settings, hardware manuals, standards, etc.) to determine a connection loss and generate a local network connection between activity devices. Based on an aggregation of data from a connection loss database, external/internal portals, historical incident databases, and other user data stores, at least one ML model may be trained and subsequently deployed to automatically determine a connection loss and generate a local network connection between activity devices. The trained ML model may be deployed to one or more devices. As a specific example, an instance of a trained ML model may be deployed to a server device and to a client device. The ML model deployed to a server device may be configured to be used by the client device when, for example, the client device is connected to the internet. Conversely, the ML model deployed to a client device may be configured to be used by the client device when, for example, the client device is not connected to the internet. In some instances, a client device may not be connected to the internet but still configured to receive satellite signals with connectivity information. In such examples, the ML model may be locally cached by the client device.

Communications module 240 is associated with sending/receiving information (e.g., sensor data module 215, risk detection module 220, connectivity module 225, local network module 230, and machine learning module 235) with a remote server or with one or more client devices, databases, routers, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 240 sends sensor information received by the sensor data module 215, user health risk information identified by risk detection module 220, connection information identified by the connectivity module 225, and local network information identified by the local network module 230.

Figure 3:
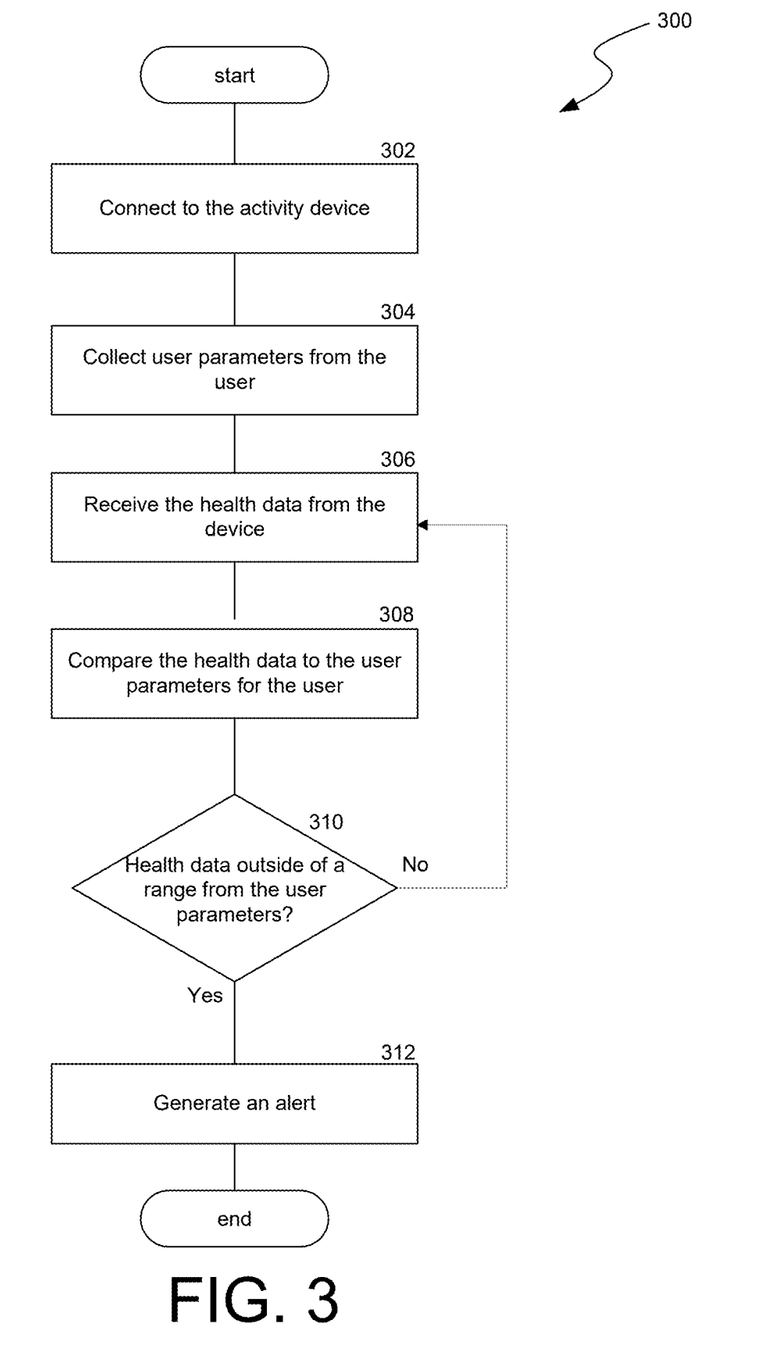
FIG. 3 is a flow diagram illustrating a process used in some implementations for identifying health incidents during an activity, in accordance with one or more embodiments of the present technology.

FIG. 3 is a flow diagram illustrating a process 300 used in some implementations for identifying health incidents during an activity, in accordance with one or more embodiments of the present technology. In some implementations, process 300 is triggered by a user activating an activity tracking application, powering on a device, the location of the device, or the user downloading an application on a device to access the activity tracking system. In various implementations, some or all of process 300 is performed locally on the user device or performed by cloud-based device(s) that can provide/support the activity tracking system.

At block 302, the activity tracking system connects to the activity device. The activity device can connect to the activity tracking system via a satellite communication link, a cellular network connection, or a Wi-Fi network connection. The activity device can connect to the activity tracking system whenever powered on, when the activity device is a threshold distance (e.g., mile, 3 miles, or any selected distance) from a user specified location, or when a user input (e.g., pressing a button, voice activated, etc.) triggers the connection. A user can provide emergency contacts for the activity tracking system to notify if an emergency is identified.

At block 304, the activity tracking system collects user parameters from the user. The user parameters can include activity details, such as a start time, an end time, a duration of the activity, a start location, a geographic region of the activity, and/or an estimated travel path. The user parameters can include health measurements (e.g., heart rate, blood pressure, respiratory rate, etc.) of the user to compare to health data collected during the activity to identify health incidents.

At block 306, the activity tracking system receives health data of the user from the activity device during an activity. The activity device can send the health data continuously or periodically, such as every minute or hourly. The health data can include blood pressure, oxygen saturation (SpO2), heart rate, respiratory rate, body temperature, or other vital signs.

At block 308, the activity tracking system compares the health data to the user parameters to determine if the user is experiencing a health incident. The health incident is determined when the health data is outside of a range for the user. In a first example, if the heart rate of the user is outside of a range of 60 to 100 beats per minute (bpm), the activity tracking system determines the user has experienced a health incident. In a second example, if the blood pressure of the user is outside of a range of 80 mm Hg to 120 mm Hg, the activity tracking system determines the user has experienced a health incident. In a third example, if the user has not returned by the provided return time, the activity tracking system determines the user is lost.

At block 310, the activity tracking system determines whether the health data is outside a range of the user parameters. The range can be provided by the user, a healthcare provider, or calculated based on the age, weight, height, and medical history of the user. For example, a heart rate range of a 30-year-old user is different than the heart rate range of a 60-year-old user. If the health data is within the range of the user parameters, the activity tracking system continues to receive health data from the activity device (at block 306).

If the health data is outside the range of the user parameters, at block 312, the activity tracking system generates an alert that the user has experienced a health incident. The alert can include the location of the user and collected health data of the user. The activity tracking system can notify the emergency contacts of the user and/or emergency authorities (e.g., park rangers, rescue teams, etc.) of the location of the user to provide aid to the user. The activity tracking system can notify devices within a proximity (e.g., within a mile) of the location of the user. In some implementations, the activity tracking system generates the alert after the health data is outside the range for a threshold time (e.g., 1 minute, 3 minutes, or any amount of time). The activity tracking system can send a notification to the activity device for the user to verify if they need assistance by responding to the notification to confirm or deny that they need assistance.

Figure 4:
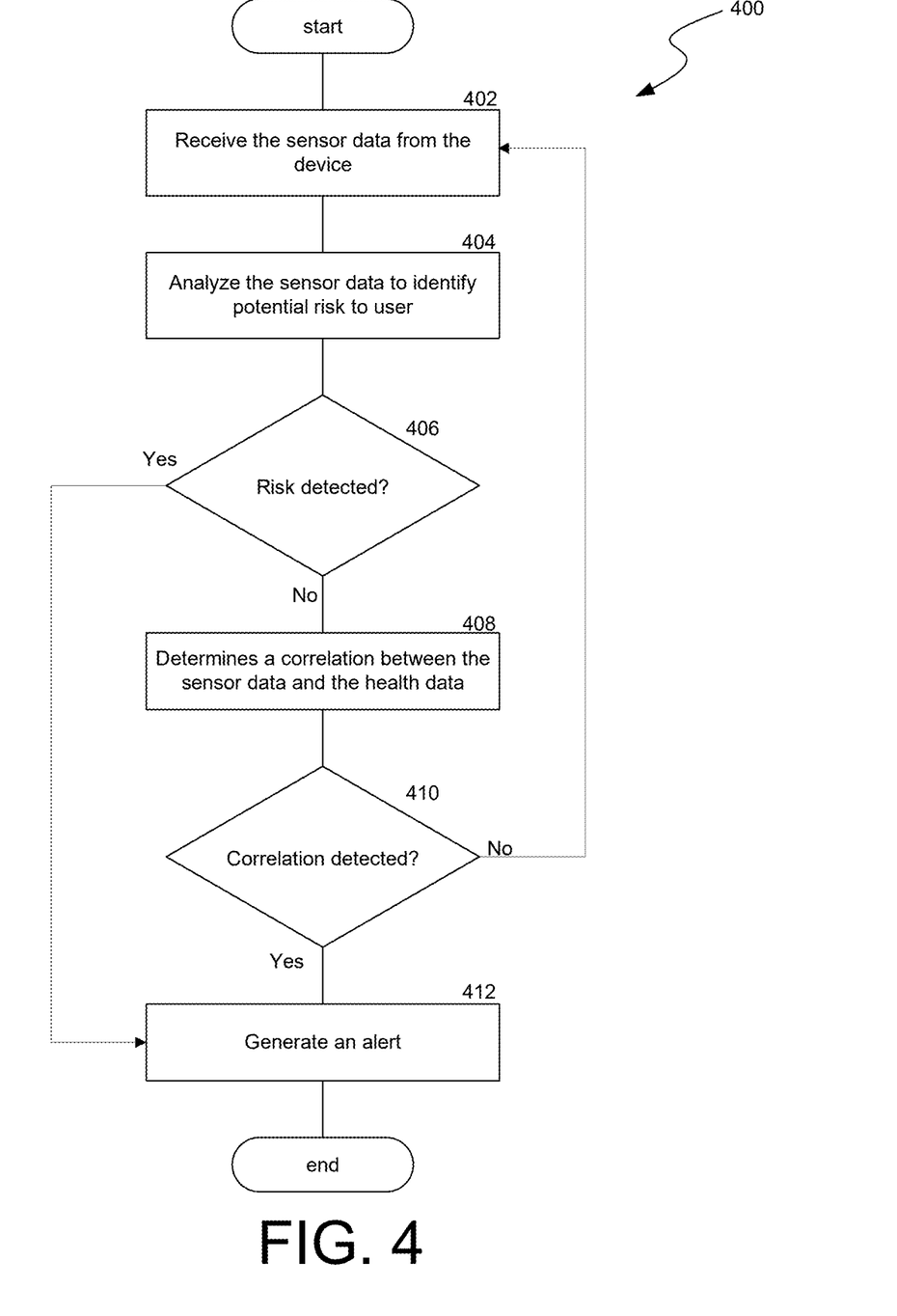
FIG. 4 is a flow diagram illustrating a process used in some implementations for determining user risk during an activity, in accordance with one or more embodiments of the present technology.

FIG. 4 is a flow diagram illustrating a process 400 used in some implementations for determining user risk during an activity, in accordance with one or more embodiments of the present technology. In some implementations, process 400 is triggered by a user activating an activity tracking application, powering on a device, the location of the device, or the user downloading an application on a device to access the activity tracking system. In various implementations, some or all of process 400 is performed locally on the user device or performed by cloud-based device(s) that can provide/support the activity tracking system.

At block 402, the activity tracking system receives senor data from the activity device during an activity. The activity device can send the sensor data continuously or periodically, such as every second, minute or hourly. The sensor data can include location data, health data, altitude data, external pressure data, accelerometer data, and/or oxygen in air data.

At block 404, the activity tracking system analyzes the sensor data to identify potential risks to the user. The sensor data can indicate if the user has experienced an event that requires assistance. In a first example, the accelerometer data indicates that the user has fallen to the ground suddenly or has fallen from a height above a threshold (e.g., 6 feet, 10 feet, or any determined distance). In a second example, the location data indicates that the user has not changed locations in several hours. At block 406, the activity tracking system determines if the user has experienced a potential risk. If a potential risk is detected, at block 412, the activity tracking system generate a notification.

If the activity tracking system determines the user has not experience a potential risk, at block 408, the activity tracking system determines a correlation between two or more types of the sensor data. The correlation can relate the different types of sensor data to determine potential risks the user has experienced. In a first example, the user has experienced a potential danger if their location is not changing but their heart rate is elevated. In a second example, the user has experienced a potential danger if their heart rate is zero and their location is changing, indicating they have fallen in a river. At block 410, the activity tracking system determines if a correlation is determined. If a correlation not determined, the activity tracking system continues to receive sensor data (at block 402).

If a correlation is determined, at block 412, the activity tracking system generates an alert that the user has experienced a health incident. The alert can include the location of the user and collected health data of the user. The activity tracking system can notify the emergency contacts of the user and/or emergency authorities (e.g., park rangers, rescue teams, etc.) of the location of the user. The activity tracking system can notify devices within a proximity (e.g., within a mile) of the location of the user. In some implementations, the activity tracking system generates the alert after the health data is outside the range for a threshold time (e.g., 1 minute, 3 minutes, or any amount of time). The activity tracking system can send a notification to the activity device for the user to verify if they need assistance by responding to the notification to confirm or deny that they need assistance.

Figure 5:
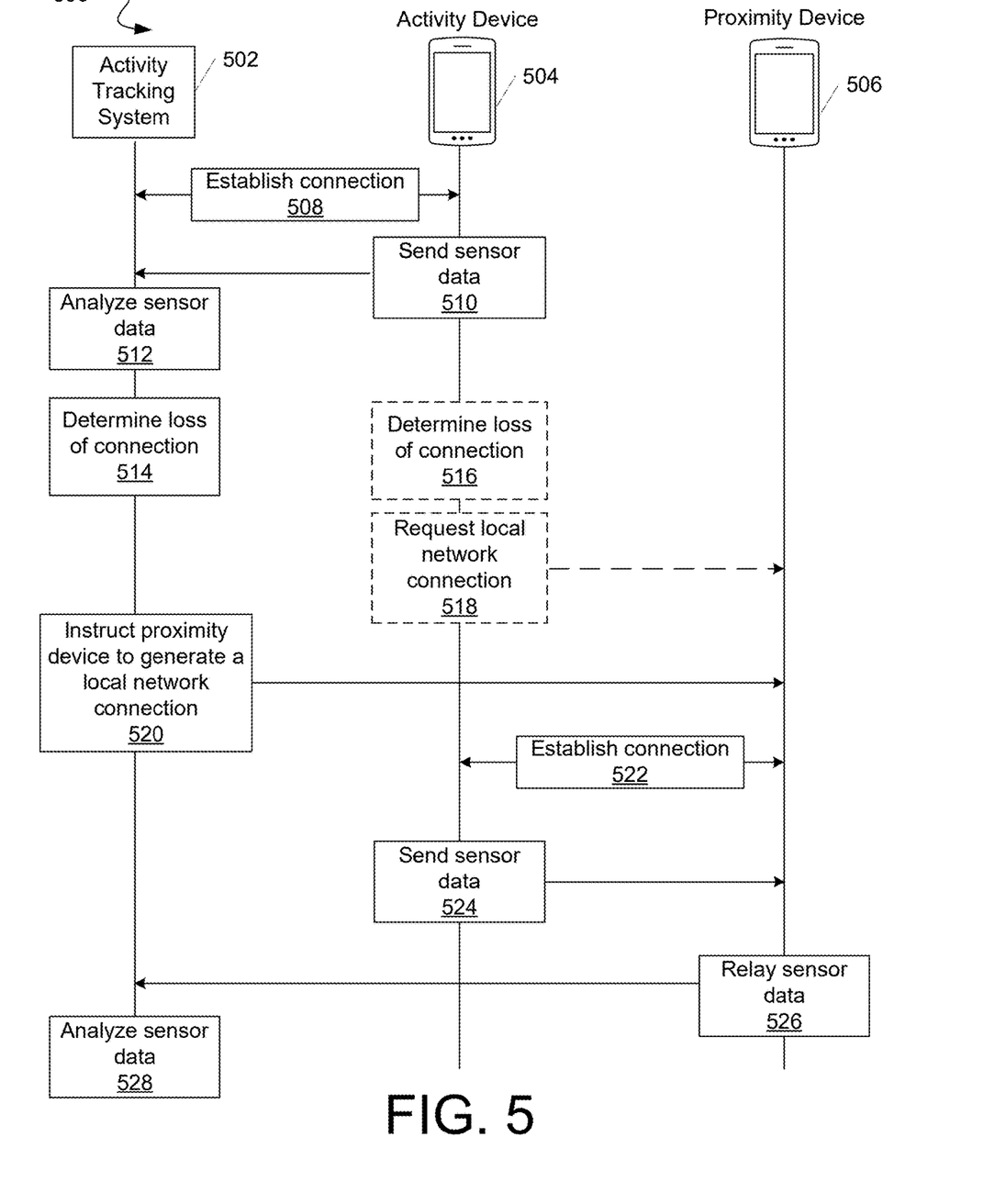
FIG. 5 is a flow diagram illustrating a process used in some implementations for generating a local network connection, in accordance with one or more embodiments of the present technology.

FIG. 5 is a flow diagram illustrating a process 500 used in some implementations for generating a local network connection, in accordance with one or more embodiments of the present technology. In some implementations, process 500 is triggered by a user activating an activity tracking application, powering on a device, the location of the device, a device losing connectivity with a server, or the user downloading an application on a device to access the activity tracking system. In various implementations, some or all of process 500 is performed locally on the user device or performed by cloud-based device(s) that can provide/support the generating a local network connection.

At block 508, the activity tracking system 502 (e.g., server 120 of FIG. 1) establishes a connection with activity device 504 (e.g., client device 102 of FIG. 1). The connection can include a satellite connection, a cellular network connection, or a Wi-Fi network connection.

At block 510, the activity device 504 sends sensor data to the activity tracking system 502. At block 512, the activity tracking system 502 analyzes the sensor data to determine if the user has experienced a health incident or is in potential danger (as described in FIG. 3 and FIG. 4).

At block 514, the activity tracking system 502 determines a loss of connection to the activity device 504. The activity tracking system 502 can determine the loss of connection based on the activity device 504 not responding to transmissions (e.g., pings) from the activity tracking system 502 for a threshold amount of time (e.g., 5 seconds, 2 minutes, or any determined amount of time) or threshold number of transmissions (e.g., 5, 10, or any determined number). In some implementations, the loss of connection is based on the network quality dropping below a threshold. The network quality can be measured in signal strength, bandwidth, latency, jitter, packet loss, and/or throughput of the connection. If a loss of connectivity is detected, at block 520, the activity tracking system 502 sends a command that instructs a proximity device 506 to generate a local network connection with the activity device 504. The activity tracking system 502 can select the proximity device 506 based on the location of activity device 504 being within a proximity (e.g., 10 yards, 0.5 miles, or any distance) of the proximity device 506. In some implementations, the proximity device 506 is selected based on a history of the proximity device 506 and the activity device 504 connecting via a local network.

In some implementations, at block 516, the activity device 504 determines a loss of connection to the activity tracking system 502. The activity device 504 can determine the loss of connection based on the activity tracking system 502 not responding to or sending transmissions (e.g., pings) to the activity device 504 for a threshold amount of time (e.g., 5 seconds, 2 minutes, or any determined amount of time). In some implementations, the loss of connection is based on the network quality dropping below a threshold. The network quality can be measured in signal strength, bandwidth, latency, jitter, packet loss, and/or throughput of the connection. If a loss of connectivity is detected, at block 518, the activity device 504 sends a request to a proximity device 506 to generate a local network connection.

At block 522, the proximity device 506 establishes a local network connection with activity device 504. The local network connection can include a local area network (LAN), a citizens broadband radios service (CBRS) connection, wireless personal area network (WPAN) connection, a Wi-Fi network connection, or any local network connection. A user can use a local CBRS or 5G local network to get connected to the network range. The local CBRS or 5G local network can be used by the user as network boosters to connect to activity device 504. Multiple such boosters can be placed at known locations to extend the network range.

At block 524, the activity device 504 sends sensor data to the proximity device 506 via the local network connection. At block 526, the proximity device 506 relays the sensor data to the activity tracking system 502. At block 528, the activity tracking system 502 analyzes the sensor data to determine if the user has experienced a health incident or is in potential danger (as described in FIG. 3 and FIG. 4).

Figure 6:
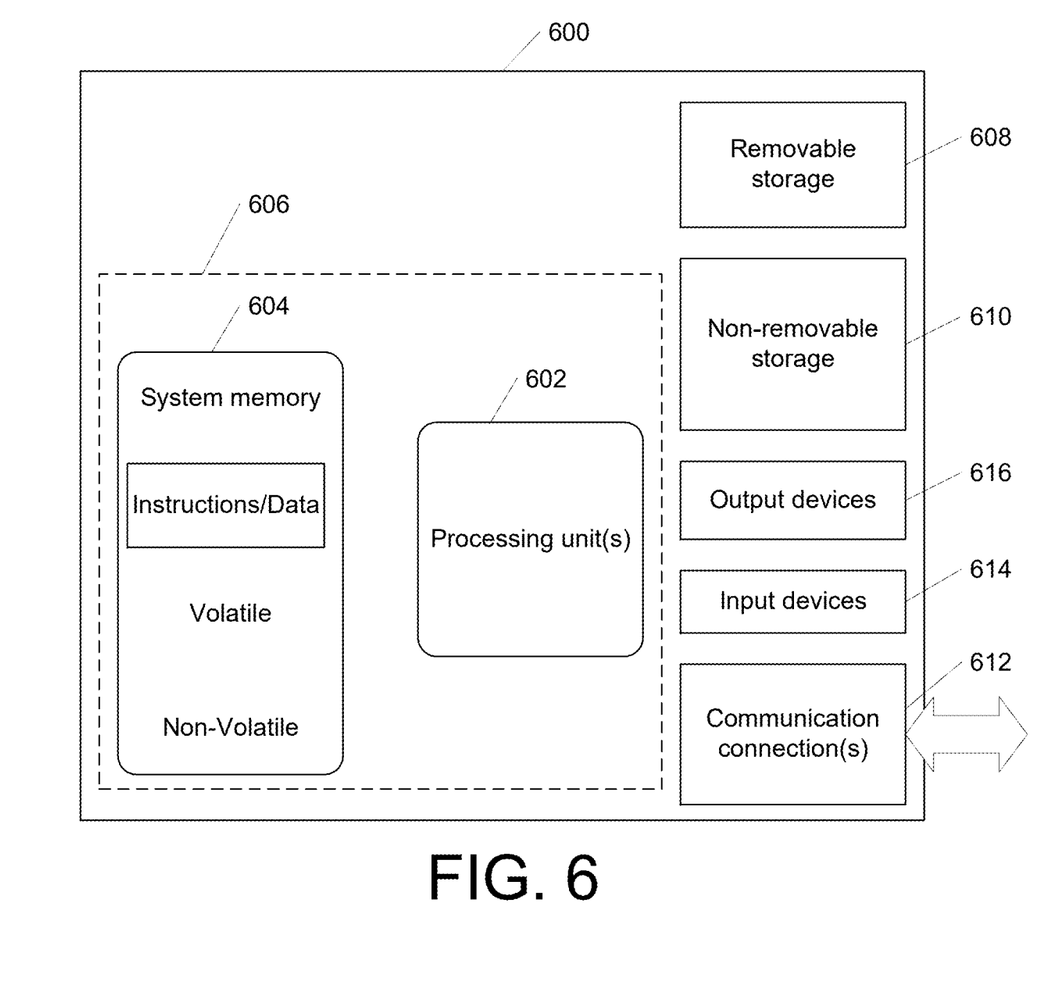
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable 608 and/or non-removable 610) including, but not limited to, magnetic or optical disks or tape. Similarly, environment 600 may also have input device(s) 614 such as keyboard, mouse, pen, voice input, etc., and/or output device(s) 616 such as a display, speakers, printer, etc. Also included in the environment may be one or more communication connections, 612, such as Bluetooth, WiFi, WiMax, LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 600 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways.

Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method for monitoring an activity of a user in a remote area, the method comprising:
    determining a loss of connection to a first activity device associated with the user;
    in response to determining the loss of connection, sending a command to a second activity device,
        wherein the command instructs the second activity device to establish a local network connection with the first activity device, and
        wherein the first activity device sends sensor data associated with the user to the second activity device via the local network connection;
    receiving, from the second activity device, sensor data associated with the user that was collected by the first activity device;
    analyzing the sensor data to determining at least one health incident of the user; and
    in response to determining the at least one health incident, generating an alert to aid the user.

2. The method of claim 1, further comprising:
    collecting one or more user parameters for the activity from the user;
    comparing the sensor data to the one or more user parameters; and
    determining the at least one health incident based on the sensor data being outside a range from the one or more user parameters.

3. The method of claim 1, further comprising:
    identifying a first type and a second type of the sensor data;
    determining a correlation between the first type and the second type of the sensor data; and determining the at least one health incident based on the correlation between the first type and the second type of the sensor data.

4. The method of claim 1, further comprising:
selecting the second activity device to receive the command based on the second activity device being within a proximity of the first activity device.

5. The method of claim 1, the method further comprising:
sending a notification to the first activity device associated with the alert; and
receiving, from the first activity device, a response confirming or denying the user has experienced the at least one health incident.

6. The method of claim 1,
wherein the sensor data includes location data, health data, altitude data, external pressure data, accelerometer data, or oxygen in air data, and
wherein the alert includes a location of the user and the sensor data associated with the user.

7. The method of claim 1, wherein the loss of connection is identified by at least one machine-learning algorithm, wherein the at least one machine-learning algorithm is trained based on at least one dataset associated with previously identified connection losses.

8. A computing system comprising:
one or more processors; and
one or more memories storing instructions that, when executed by the one or more processors, cause the computing system to perform a process for monitoring an activity of a user in a remote area, the process comprising:
determining a loss of connection to a first activity device associated with the user;
in response to determining the loss of connection, sending a command to a second activity device,
wherein the command instructs the second activity device to establish a local network connection with the first activity device, and
wherein the first activity device sends sensor data associated with the user to the second activity device via the local network connection;
receiving, from the second activity device, sensor data associated with the user that was collected by the first activity device;
analyzing the sensor data to determining at least one health incident of the user; and
in response to determining the at least one health incident, generating an alert to aid the user.

9. The computing system of claim 8, wherein the process further comprises:
collecting one or more user parameters for the activity from the user;
comparing the sensor data to the one or more user parameters; and
determining the at least one health incident based on the sensor data being outside a range from the one or more user parameters.

10. The computing system of claim 8, wherein the process further comprises:
identifying a first type and a second type of the sensor data;
determining a correlation between the first type and the second type of the sensor data; and
determining the at least one health incident based on the correlation between the first type and the second type of the sensor data.

11. The computing system of claim 8, wherein the process further comprises:
selecting the second activity device to receive the command based on the second activity device being within a proximity of the first activity device.

12. The computing system of claim 8, wherein the process further comprises:
sending a notification to the first activity device associated with the alert; and
receiving, from the first activity device, a response confirming or denying the user has experienced the at least one health incident.

13. The computing system of claim 8,
wherein the sensor data includes location data, health data, altitude data, external pressure data, accelerometer data, or oxygen in air data, and
wherein the alert includes a location of the user and the sensor data associated with the user.

14. The computing system of claim 8, wherein the loss of connection is identified by at least one machine-learning algorithm, wherein the at least one machine-learning algorithm is trained based on at least one dataset associated with previously identified connection losses.

15. A non-transitory computer-readable medium storing instructions that, when executed by a computing system, cause the computing system to perform operations for monitoring an activity of a user in a remote area, the operations comprising:
determining a loss of connection to a first activity device associated with the user;
in response to determining the loss of connection, sending a command to a second activity device,
wherein the command instructs the second activity device to establish a local network connection with the first activity device, and
wherein the first activity device sends sensor data associated with the user to the second activity device via the local network connection;
receiving, from the second activity device, sensor data associated with the user that was collected by the first activity device;
analyzing the sensor data to determining at least one health incident of the user; and
in response to determining the at least one health incident, generating an alert to aid the user.

16. The non-transitory computer-readable medium of claim 15, wherein the operations further comprise:
collecting one or more user parameters for the activity from the user;
comparing the sensor data to the one or more user parameters; and
determining the at least one health incident based on the sensor data being outside a range from the one or more user parameters.

17. The non-transitory computer-readable medium of claim 15, wherein the operations further comprise:
identifying a first type and a second type of the sensor data;
determining a correlation between the first type and the second type of the sensor data; and
determining the at least one health incident based on the correlation between the first type and the second type of the sensor data.

18. The non-transitory computer-readable medium of claim 15, wherein the operations further comprise:

selecting the second activity device to receive the command based on the second activity device being within a proximity of the first activity device.

19. The non-transitory computer-readable medium of claim 15, wherein the operations further comprise:
   sending a notification to the first activity device associated with the alert; and
   receiving, from the first activity device, a response confirming or denying the user has experienced the at least one health incident.

20. The non-transitory computer-readable medium of claim 15,
   wherein the sensor data includes location data, health data, altitude data, external pressure data, accelerometer data, or oxygen in air data,
   wherein the alert includes a location of the user and the sensor data associated with the user, and
   wherein the loss of connection is identified by at least one machine-learning algorithm, wherein the at least one machine-learning algorithm is trained based on at least one dataset associated with previously identified connection losses.

* * * * *